(12) United States Patent
Wooden et al.

(10) Patent No.: US 6,618,244 B2
(45) Date of Patent: *Sep. 9, 2003

(54) TILT MOUNTED HARD DRIVE BAY

(75) Inventors: Brad R. Wooden, Aloha, OR (US); Lane C. Cobb, Ridgefield, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/236,167

(22) Filed: Sep. 3, 2002

(65) Prior Publication Data

US 2003/0011982 A1 Jan. 16, 2003

Related U.S. Application Data

(63) Continuation of application No. 09/513,539, filed on Feb. 25, 2000, now Pat. No. 6,445,576.

(51) Int. Cl.[7] .................................................. H05K 7/16
(52) U.S. Cl. ..................... 361/683; 361/725; 312/223.1; 364/708.1
(58) Field of Search ................................. 361/683, 685, 361/724–727; 312/223.1–223.6; 364/708.1; D14/100–117

(56) References Cited

U.S. PATENT DOCUMENTS 6,404,625 B1 * 6/2002 Chen et al. .................. 361/683
6,445,576 B1 * 9/2002 Wooden et al. ............. 361/683

* cited by examiner

Primary Examiner—Darren Schuberg
Assistant Examiner—Hung Van Duong
(74) Attorney, Agent, or Firm—Fish & Richardson P.C.

(57) ABSTRACT

A hinged disk drive bay for a server. The bay is hinged such that it moves between a stowed position in which the bay is vertical, and a tilted position in which the bay is open. When open, the connections are exposed to the user.

23 Claims, 4 Drawing Sheets

TILT MOUNTED HARD DRIVE BAY

CROSS-REFERENCE TO RELATED APPLICATIONS

This application is a continuation application of and claims priority to U.S. application Ser. No. 09/513,539, filed on Feb. 25, 2000 now U.S. Pat. No. 6,445,576.

BACKGROUND

Computers often operate using connections between a main processing board, e.g. a motherboard, and auxiliary equipment. The auxiliary equipment can include a disk drive, such as a "hard drive".

Such devices have often been mounted in a bay within a computer. However, removing the hard drive often requires that the end user access the inside of the computer by removing the outer cover. Once inside, it not always intuitive how to remove the hard drive.

BRIEF DESCRIPTION OF THE DRAWINGS

These and other aspects will be described in detail with reference to the drawings, in which.

DETAILED DESCRIPTION

The present application teaches a system of mounting a removable drive rack. This system can hold removable drives in a special and new way within a computer system. The computer system can be a headless server or any other kind of computer system.

Figure 1:
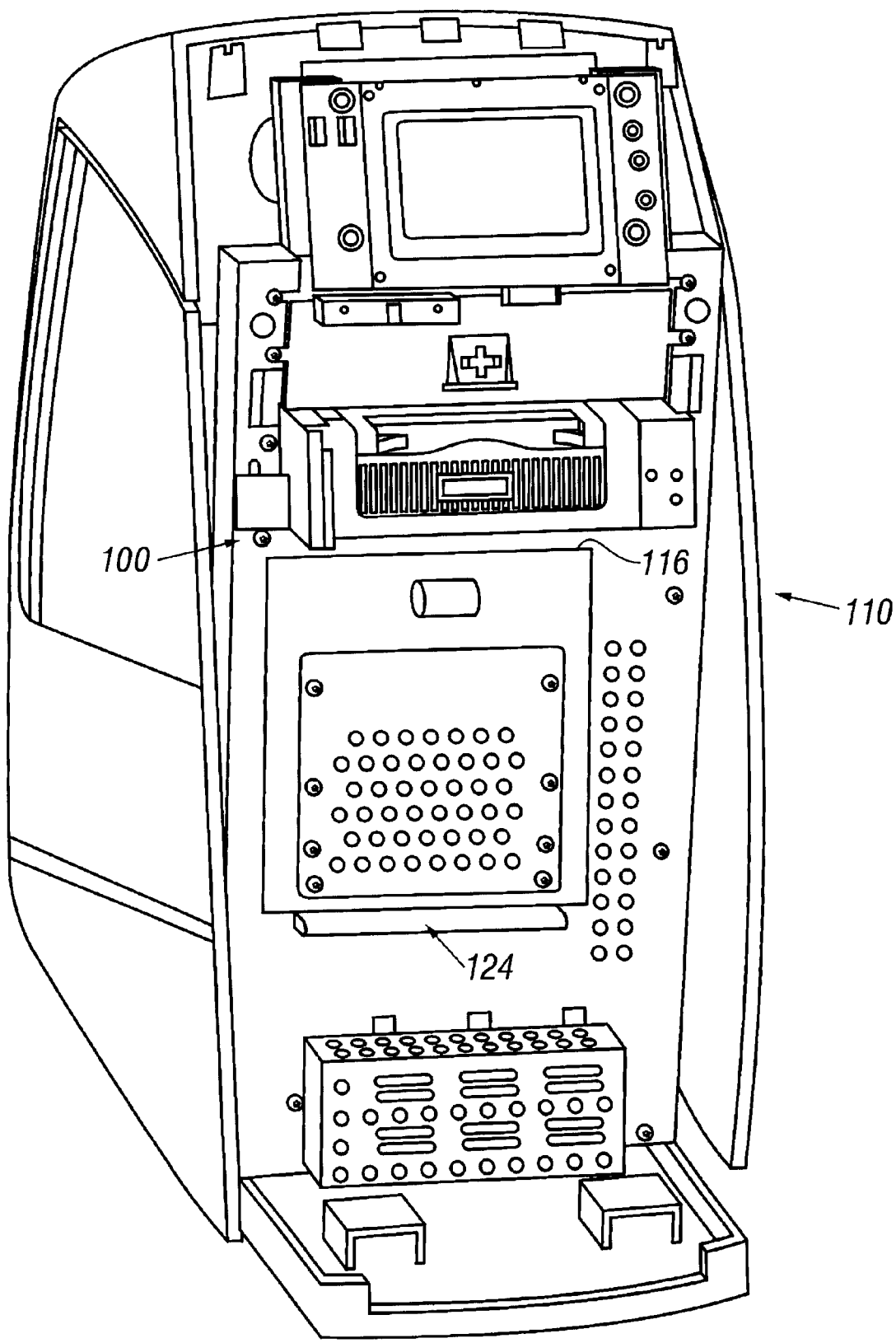
FIG. 1 shows a front view of the computer system.

FIG. 1 shows the front of the chassis 100. The chassis includes conventional structure to house computer parts. The chassis has a front, rear, and other parts, as well as computer holding parts. The special tilt mounted drive bay of the present application is located in the front of the chassis where it can be most easily accessed by a user. The bay is arranged with a hinge element 124 that enables the top portion 116 of the drive bay to tilt forward, away from the front of the chassis 100, and to face toward the user.

Figure 2:
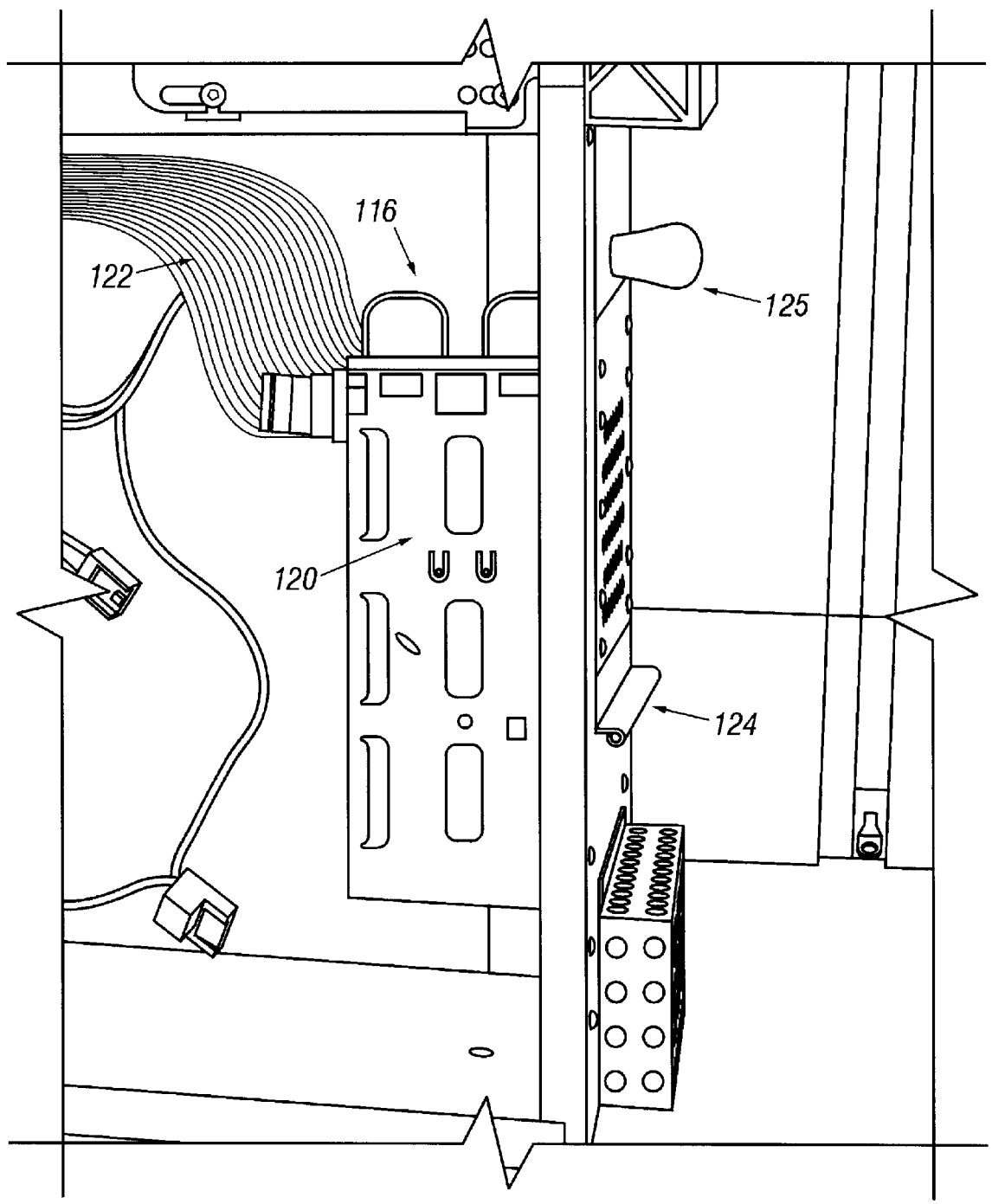
FIG. 2 shows a side view of the computer system, showing the drive rack in its stowed position.

FIG. 2 shows the chassis 100 as viewed from the side. The chassis has inside surfaces defining at least one disk drive mounting surface, against which the disk drive is pressed to hold the disk drive in place. The drive bay 120 can be mounted vertically when in its stowed position, such that the platter of the hard drive or drives that are within the drive bay will spin in the vertical direction, substantially in parallel to an axis of the chassis. Alternately the drive can rotate in any desired way. The top of the drive bay will swing out toward the user, hinged on hinge element 124. A handle 125 allows the door to be pulled into the hinged position.

The drives within the bay 120 are connected, via connection cable 122, to the computer, e.g., the drive controller element on the motherboard. The front of the drives are arranged near hinge element 124.

Figure 3:
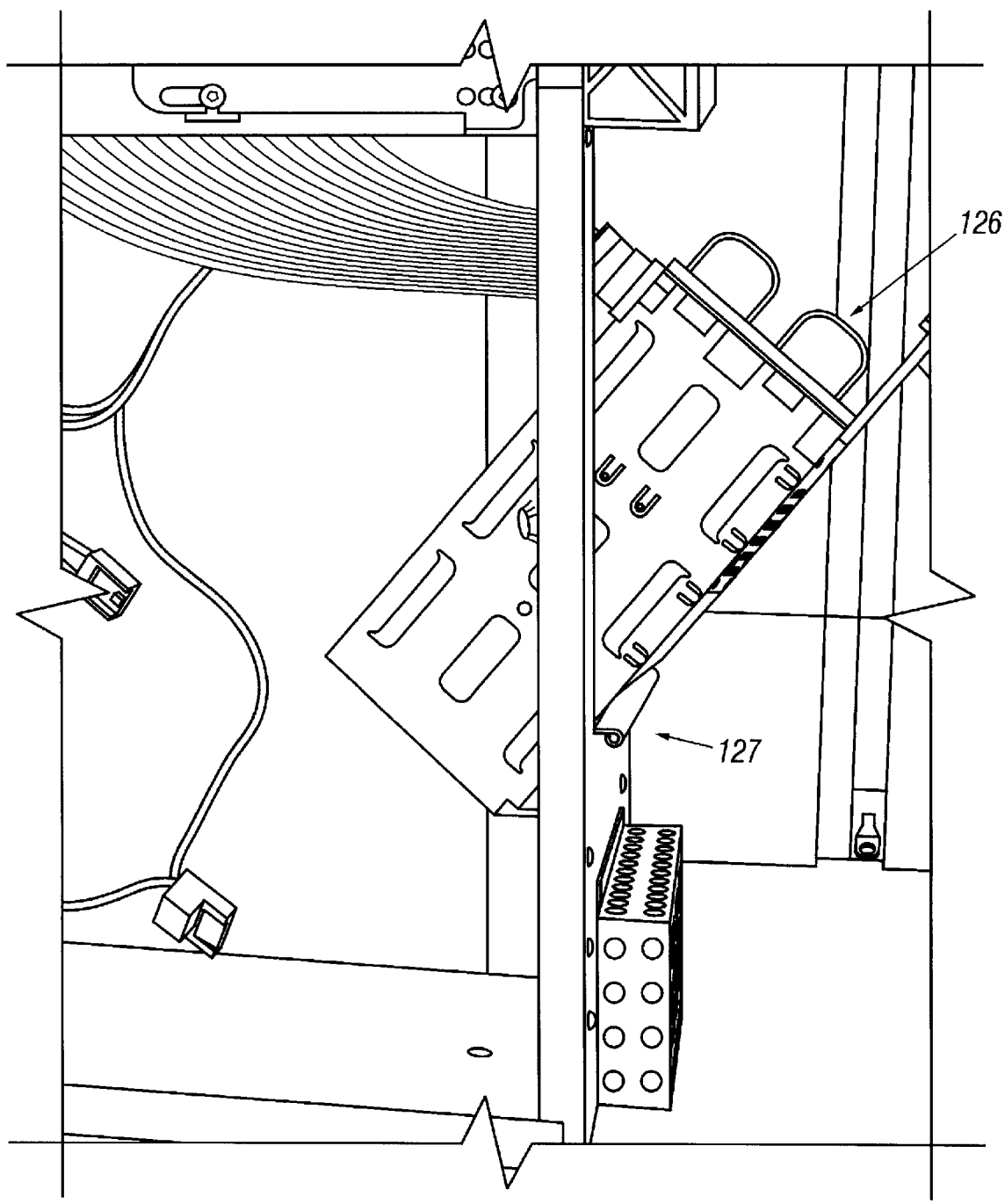
FIGS. 3 and 4 show the drive rack being tilted out.

The drive bay is moved between its open and closed position by applying force using the handle 125, to hinge the unit on this hinge element 124. FIG. 3 shows the hard drive being moved to its hinged-out position. A stop surface 127 presses against the chassis to limit the amount of motion of the disk drive. The top of the drive bays is tilted outward by this operation.

The disk drives are inserted into the bays with their front portion facing down, and their rear portions facing up. The rear portion includes the connection area, which connects to the data cable 122 from the computer and the power connector.

FIG. 3 shows how the top portion 126 of the drive bay 120 can be swung outward towards the user. This top portion exposes the rear of the disk drive, which is where the connections are made. Hence, when opened in this way, the user gets access to the cabling 122, which is swung out, away from the chassis and toward the user.

Figure 4:
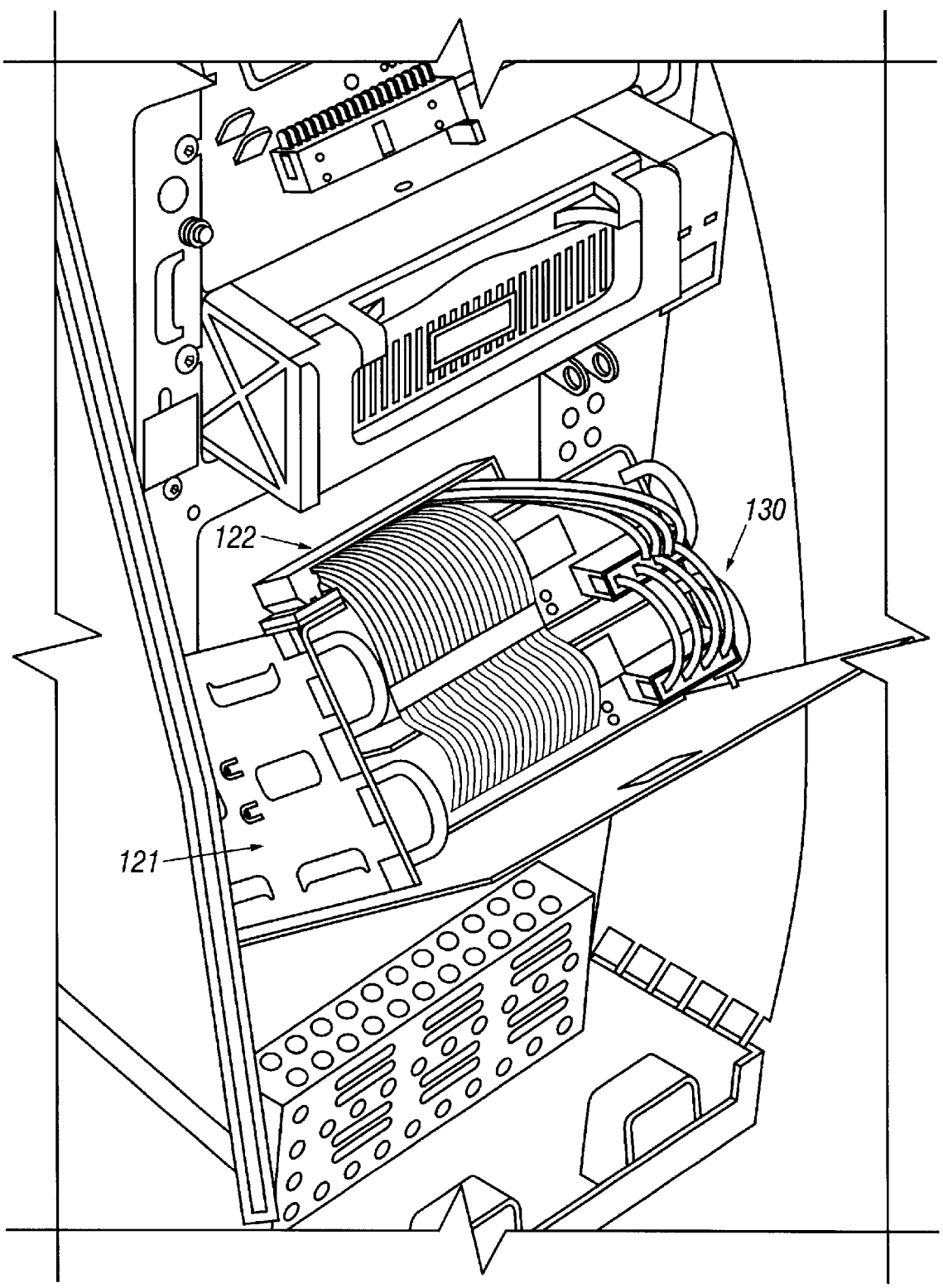

FIG. 4 shows the view seen by the user when the hard drive bay is swung out in this way. The user gets access to the rear portion 126 of one or more hard drives. FIG. 4 shows how two hard drives can be mounted in adjacent bays, where the two drives are constrained relative to one another. The user has access to power connections 130 as well as to data connections 122. This allows the user to easily remove connections, remove a drive, insert a new drive, reconnect the new drive, and begin operation using the new drive.

Again, a first and second hard drive can both be encased within the same tiltable housing 121 using this technique.

The disk drive connections 122, 130 can be removed, and the disk drive can then be physically removed from the bays. The drives can be serviced or replaced with another drive. This system is much easier to open, and the cabling is simplified, since the connection does not move as far, and hence the cables need not be as long as in the prior art. This facilitates making the devices, and also facilitates removing and swapping the drives. This can be especially important in a headless server that has no user interface, since it allows relatively easy update to such a system.

Although only a few embodiments have been disclosed in detail above, other modifications are contemplated. For instance, while only two disk drives are disclosed to be within the drive bay, any number of disk drives, e.g., from 1 to 8 of such drives, can be used. All such modifications are intended to be encompassed within the following claims, in which:

What is claimed is:

1. A computer system comprising:
    a housing, having an internal portions with connections adapted for supporting parts;
    said housing also including an outer surface with a hinging surface thereon, and a drive chassis with drive mounting surfaces therein which holds a disk drive, said hinging surface including a hinge element allowing said drive chassis to be tilted between a first position in which the drive bay is mounted within said housing and a second position in which the drive bay is tilted such that a portion of the drive bay extends outside the housing.

2. A system as in claim 1, in which said first position is a position which allows platters of the disk drive to spin in a designed for plane.

3. A system as in claim 1, further comprising a plurality of computer parts forming a headless server which does not include a user interface.

4. A system as in claim 1, wherein said second position exposes connections of said disk drive.

5. A system as in claim 1, wherein a portion of the drive bay adjacent to data connections and power connections of said disk drive are outside the housing when said drive chassis is in said second position.

6. A system as in claim 1, wherein said drive bay holds two hard drives in parallel to one another in both said first position and said second position.

7. A system as in claim 1, further comprising a handle, coupled to said outer surface, and allowing moving said drive chassis between said first and second positions.

8. A system as in claim 1, further comprising an area for cables to extend from said housing to said drives, when in said second position.

9. A system as in claim 2, wherein said first position allows said disk drives to spin in a vertical plane.

10. A system as in claim 2, further comprising a stop surface which limits an amount of movement of said hinge.

11. A computer housing, comprising
   an internal portion, including surfaces for supporting computer parts including a hard drive controller;
   an external portion, including surfaces for supporting a tiltable part, which may be stowed into a first position entirely within the computer housing and tilted to a second position in which a portion of the tiltable part extends outside the housing.

12. A housing as in claim 11, in which said tiltable part is a drive bay.

13. A housing as in claim 11, in which said tiltable part is a substantially rectangular box, having inner surfaces which are hinged between a first position in which an axis of the box is substantially parallel to an axis of said housing, and a second position in which said axis of the box is tilted relative to an axis of said housing.

14. A housing as in claim 11, wherein said external portion further includes a stop surface that limits an amount of tilting of said tiltable part.

15. A housing as in claim 11, further comprising surfaces in said external portion which allow connections to a part that extends outside the housing.

16. A computer housing, comprising:
   a substantially rectangular box, having an inner part and an outer part; and
   a substantially rectangular tiltable part, connected to said outer part of said substantially rectangular box, and movable between a first position in which the tiltable part is entirely within said substantially rectangular box and a second position in which a part of the tiltable part is outside said substantially rectangular box.

17. A housing as in claim 16, wherein said tiltable part is a disk drive bay, and includes connections for a disk drive.

18. A housing as in claim 16, wherein said tiltable part is a disk drive bay, and includes connections for two disk drives.

19. A housing as in claim 17, further comprising a cable conduit, enabling cable for connection to a disk drive to extend outside the housing when said tiltable part is in said second position.

20. A method, comprising:
   operating a computer with its hard drives in a first position in which platters of the hard drives spin in a designed for direction; and
   tilting said hard drives to a second position that is tilted relative to the first position, and which exposes connections of said hard drives to an area outside a computer housing.

21. A method as in claim 20, wherein said tilting comprises tilting a plurality of hard drives which are connected mechanically relative to one another.

22. A method as in claim 20, wherein said designed for position is vertical.

23. A method as in claim 20, further comprising limiting an amount of tilt of said hard drives to an amount less than an extension of a hard drive cable.

* * * * *